(12) United States Patent
Okuda (10) Patent No.: US 9,193,308 B2
(45) Date of Patent: Nov. 24, 2015

(54) IN-VEHICLE CAMERA

(75) Inventor: Syo Okuda, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 13/366,799

(22) Filed: Feb. 6, 2012

(65) Prior Publication Data

US 2012/0207461 A1    Aug. 16, 2012

(30) Foreign Application Priority Data

Feb. 10, 2011   (JP) .................... 2011-027565

(51) Int. Cl.
*G03B 17/00* (2006.01)
*B60R 11/04* (2006.01)
*B60R 11/00* (2006.01)

(52) U.S. Cl.
CPC ......... *B60R 11/04* (2013.01); *B60R 2011/0026* (2013.01)

(58) Field of Classification Search
USPC ......................................................... 396/419
See application file for complete search history.

(56) References Cited

U.S. PATENT DOCUMENTS

| | | | |
|---|---|---|---|
| 6,386,742 B1 | 5/2002 | DeLine et al. | |
| 7,111,996 B2 * | 9/2006 | Seger et al. ................... | 396/419 |
| 7,480,149 B2 * | 1/2009 | DeWard et al. ............... | 361/728 |
| 8,508,594 B2 * | 8/2013 | Fishman ....................... | 348/149 |
| 8,548,315 B2 | 10/2013 | Okuda | |
| 2003/0010890 A1 | 1/2003 | Sakata | |
| 2003/0059217 A1 * | 3/2003 | Baek .............................. | 396/427 |
| 2004/0027458 A1 * | 2/2004 | Takada ....................  | 348/207.99 |
| 2009/0046150 A1 * | 2/2009 | Hayakawa et al. ........... | 348/148 |
| 2010/0265328 A1 * | 10/2010 | Chou ............................ | 348/143 |
| 2011/0163904 A1 * | 7/2011 | Alland et al. ..................... | 342/1 |
| 2012/0026330 A1 * | 2/2012 | Huelsen et al. ............... | 348/148 |
| 2012/0033079 A1 * | 2/2012 | Karl .............................. | 348/148 |
| 2012/0075471 A1 * | 3/2012 | Seger et al. ................... | 348/148 |
| 2012/0081544 A1 | 4/2012 | Wee | |
| 2013/0050489 A1 * | 2/2013 | Taylor et al. .................. | 348/148 |
| 2014/0016919 A1 | 1/2014 | Okuda | |
| 2014/0160284 A1 * | 6/2014 | Achenbach et al. .......... | 348/143 |

FOREIGN PATENT DOCUMENTS

JP            05-032191           4/1993

(Continued)

OTHER PUBLICATIONS

Office Action issued Jan. 29, 2013 in corresponding Japanese Application No. 2011-027565 with English translation. Office Action issued Mar. 18, 2014 in corresponding Japanese Application No. 2013-143221 (with English translation).

(Continued)

*Primary Examiner* — Clayton E Laballe
*Assistant Examiner* — Linda B Smith
(74) *Attorney, Agent, or Firm* — Harness, Dickey & Pierce, P.L.C.

(57) ABSTRACT

An in-vehicle camera is provided which has a case and a lens, and which is attached in a vehicle interior so that the lens is exposed at a top face of the case and the top face is opposed to a windshield. The top face has an angular shape bent at a ridge line passing through the top face. The lens is positioned in the vicinity of the ridge line.

20 Claims, 5 Drawing Sheets

(56) References Cited

FOREIGN PATENT DOCUMENTS

| JP | 11-078717 | 2/1999 |
| JP | 2002-341432 | 11/2002 |
| JP | 2003-025928 | 1/2003 |
| JP | 2004-075033 | 3/2004 |
| JP | 2012-080517 | 4/2012 |
| WO | WO 2010/042483 | 4/2010 |

OTHER PUBLICATIONS

Office Action dated Mar. 21, 2014 in co-pending U.S. Appl. No. 14/031,103.
Office Action dated Mar. 4, 2015 in corresponding Japanese Application No. 2013-143221.
Office Action dated Oct. 21, 2014 in corresponding Japanese Application No. 2013-143221.

* cited by examiner

FIG.8

IN-VEHICLE CAMERA

CROSS-REFERENCE TO RELATED APPLICATION

This application is based on and claims the benefit of priority from earlier Japanese Patent Application No. 2011-27565 filed Feb. 10, 2011, the description of which is incorporated herein by reference.

BACKGROUND

1. Technical Field

The present invention relates to an in-vehicle camera.

2. Related Art

In recent years, techniques have been in practical use in which an in-vehicle camera is installed in a vehicle. According to the techniques, assistance for driving the vehicle is performed by using images taken by the in-vehicle camera (refer to JP-UM-A-5-32191).

The in-vehicle camera may be attached to a windshield from the inside of the vehicle. This type of in-vehicle camera is attached so that the top face of a case thereof is opposed to the windshield. In addition, the top face of the case is inclined downward depending on the inclination angle of the windshield. The lens of the camera is exposed at the top face of the case.

Figure 8:
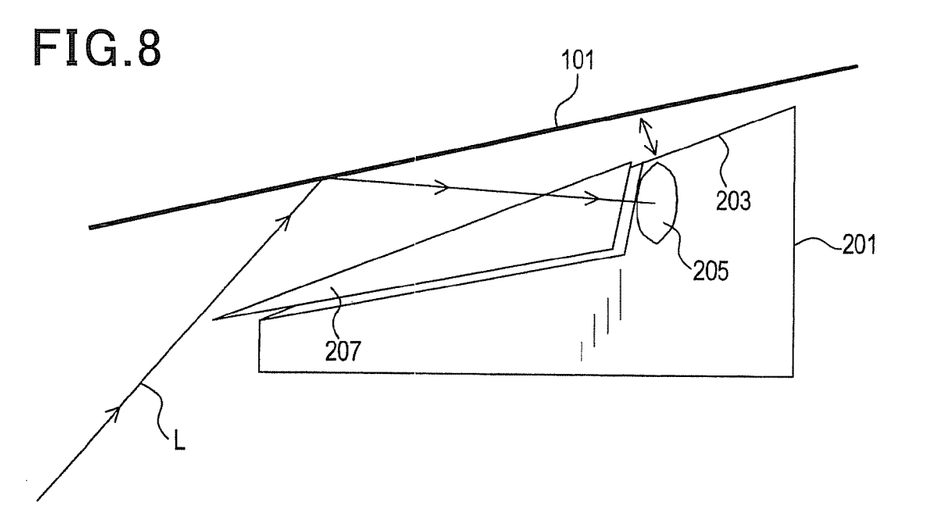
FIG. 8 is a side view showing a conventional in-vehicle camera.

The inclination angle of the windshield varies depending of the type of vehicle. Meanwhile, the in-vehicle camera is attached so as to constantly face in a constant direction with respect to a road surface. Hence, the inclination angle of the top face of the in-vehicle camera, which is attached to the windshield, is uniformly determined for each in-vehicle camera. Therefore, in a certain type of vehicle, as shown in FIG. 8, the inclination angle of the top face 203 of the in-vehicle camera 201 does not agree with the inclination angle of a windshield 101, whereby a lens 205 of the in-vehicle camera 201 is distanced from the windshield 101. In this case, a phenomenon is caused in which light L coming from the lower side is reflected off the windshield 101 and enters the lens 205 (reflection). To prevent this reflection, a hood 207, which is attached to the lower side of the lens 205, is required to project longer toward the front side so as to shield the light L. However, if such a long hood 207 is attached, it becomes difficult to install the in-vehicle camera 201 in a narrow space.

SUMMARY

An embodiment provides an in-vehicle camera in which reflection is prevented even when the inclination angle of a windshield varies.

As an aspect of the embodiment, an in-vehicle camera is provided which has a case and a lens, and which is attached in a vehicle interior so that the lens is exposed at a top face of the case and the top face is opposed to a windshield. The top face has an angular shape bent at a ridge line passing through the top face. The lens is positioned in the vicinity of the ridge line.

DETAILED DESCRIPTION OF THE PREFERRED EMBODIMENTS

With reference to the accompanying drawings, hereinafter is described an embodiment of the present invention.

Figure 1:
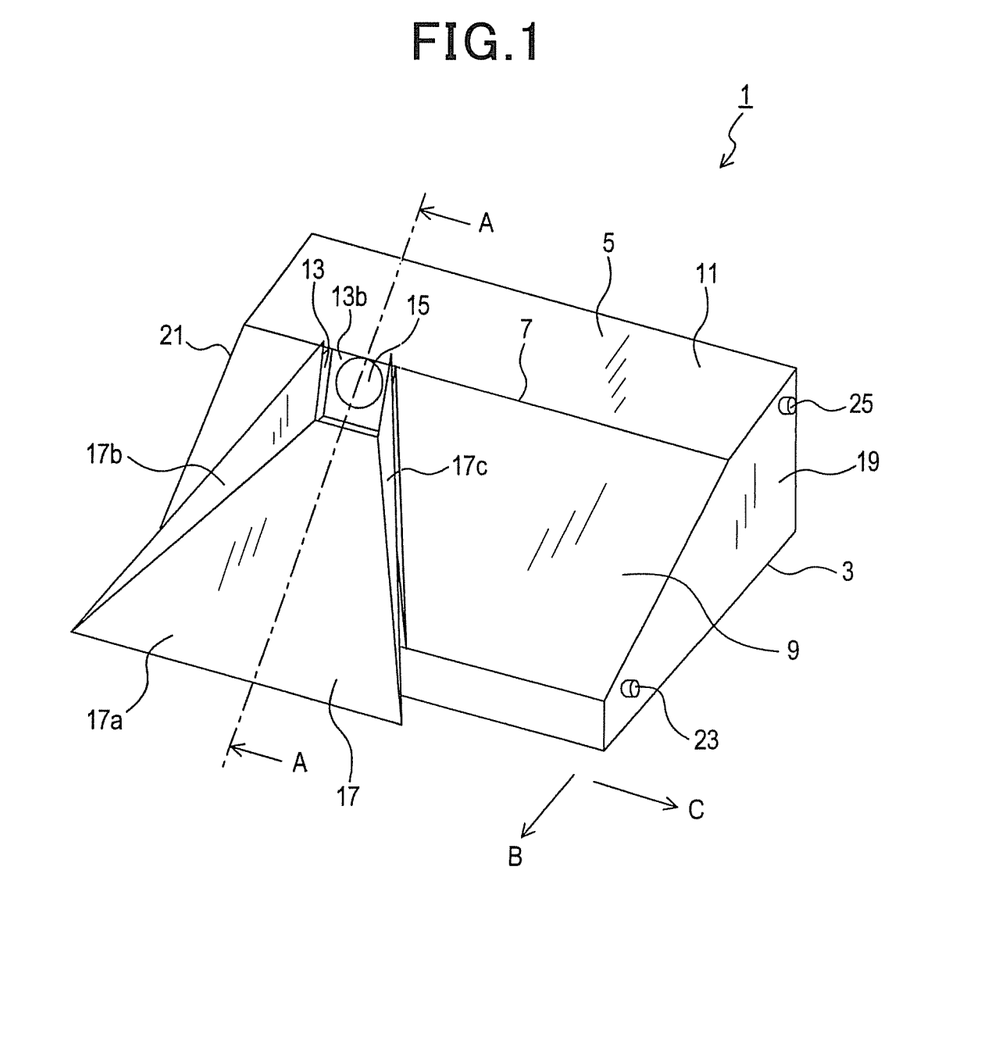
FIG. 1 is a perspective view of an in-vehicle camera according to an embodiment.
Figure 2:
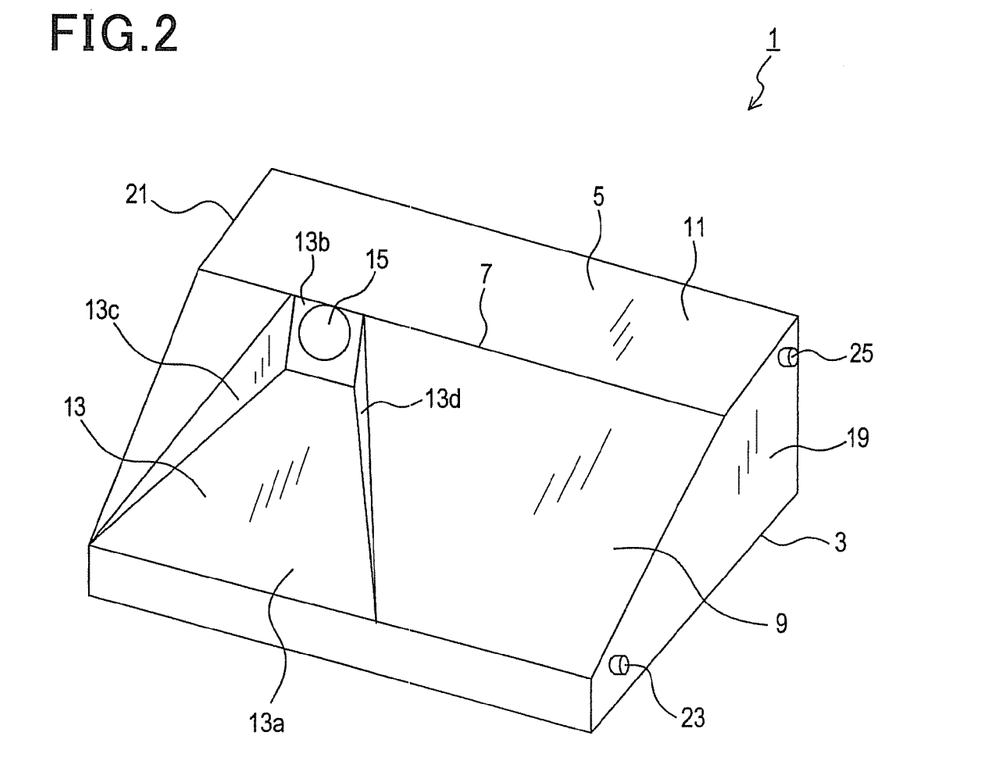
FIG. 2 is a perspective view of the in-vehicle camera (from which a hood is removed)
Figure 3:
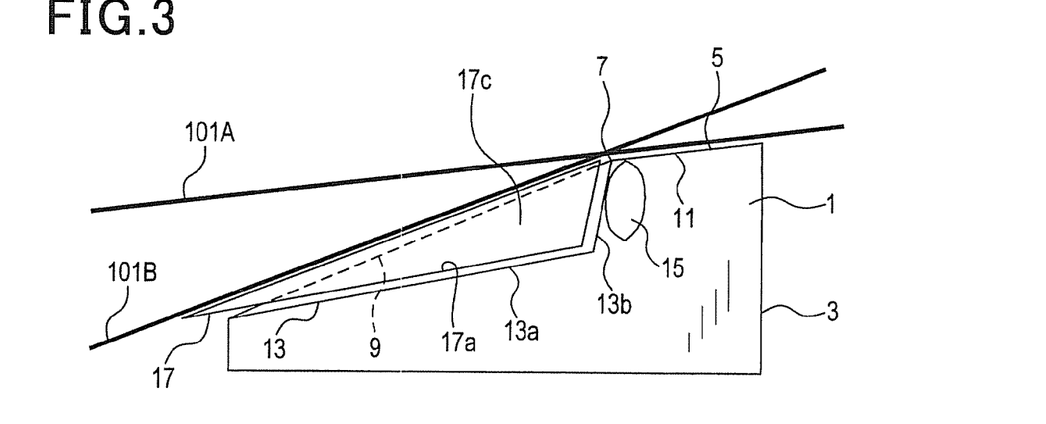
FIG. 3 is a sectional side view taken along a line A-A in FIG. 1.
Figure 4:
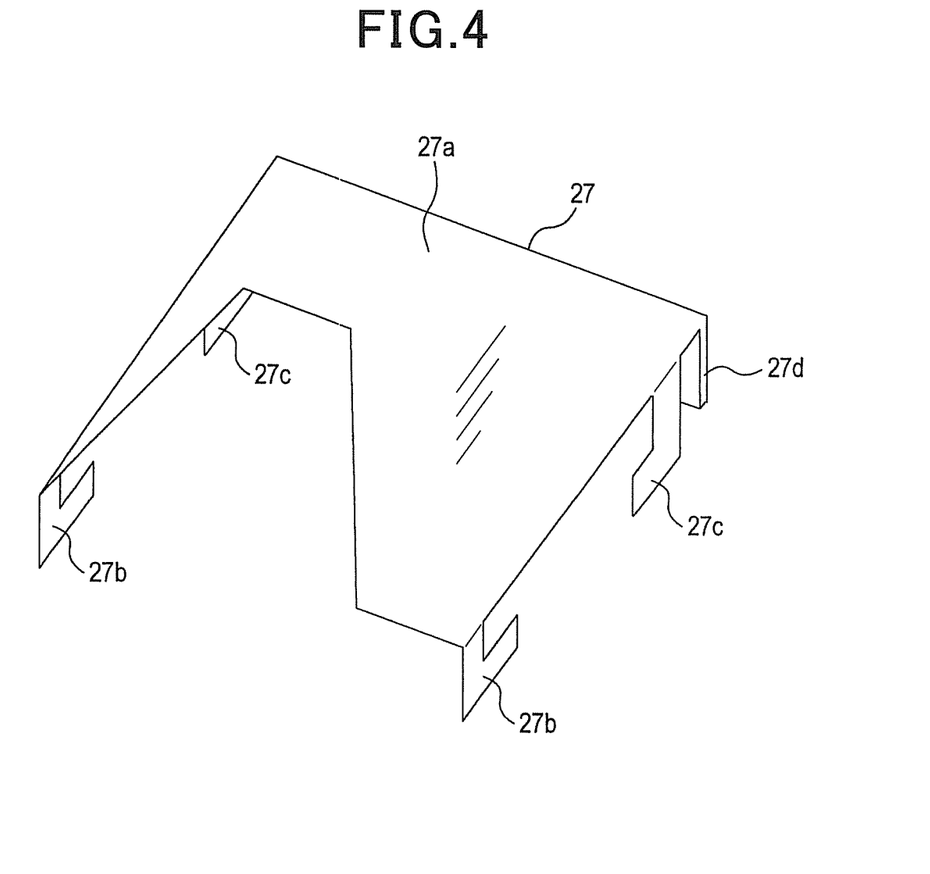
FIG. 4 is a perspective view of a bracket.
Figure 5:
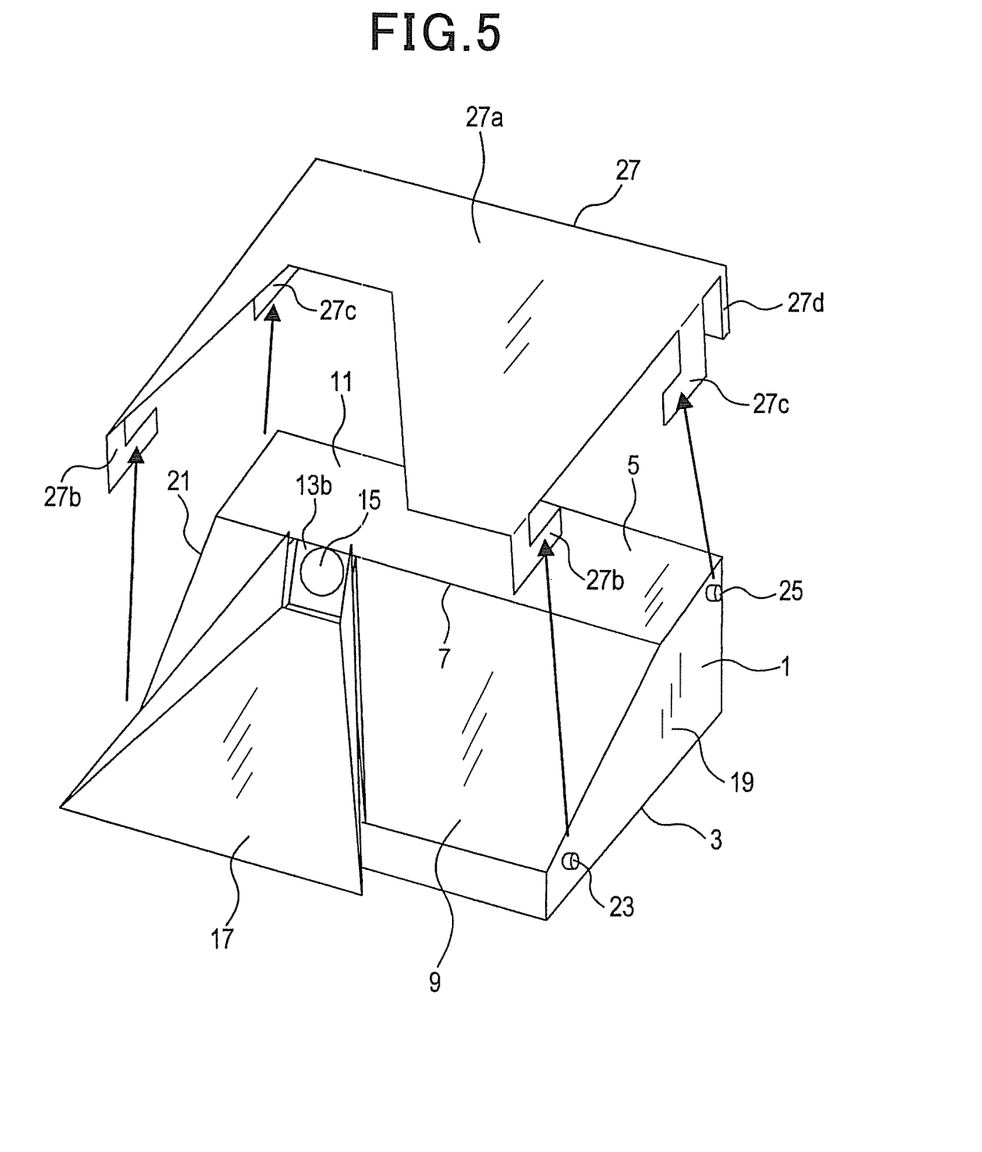
FIG. 5 is a diagram for explaining a method of attaching the in-vehicle camera to the bracket.
Figure 6:
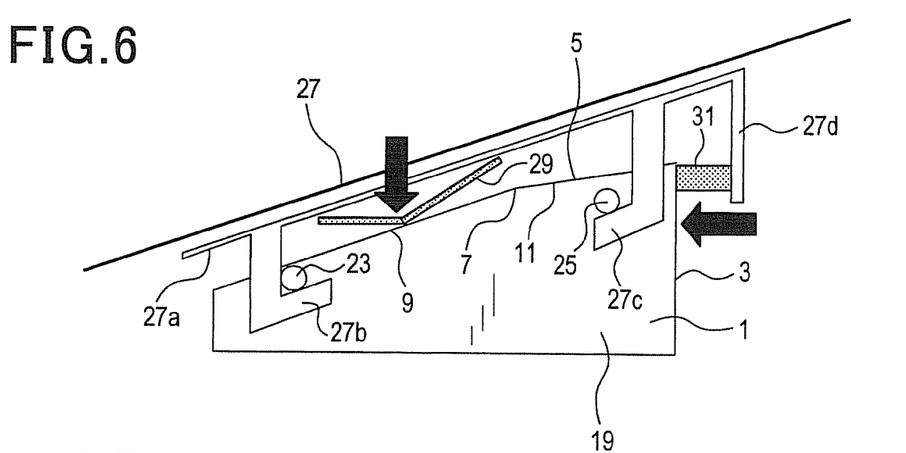
FIG. 6 is a diagram for explaining a state in which the in-vehicle camera is attached to the bracket.

1. The Configuration of an in-Vehicle Camera 1:

Hereinafter, the configuration of the in-vehicle camera 1 will be described with reference to FIGS. 1 to 6. FIG. 1 is a perspective view of the in-vehicle camera 1. FIG. 2 is a perspective view of the in-vehicle camera 1 (from which a hood 17 described later is removed). FIG. 3 is a sectional side view taken along a line A-A in FIG. 1. FIG. 4 is a perspective view of a bracket 27 described later. FIG. 5 is a diagram for explaining a method of attaching the in-vehicle camera 1 to the bracket 27. FIG. 6 is a diagram for explaining a state in which the in-vehicle camera 1 is attached to the bracket 27.

The in-vehicle camera 1 is attached in a vehicle interior. As shown in FIGS. 1 and 2, the in-vehicle camera 1 includes a case 3 and components (not shown) of a well-known camera housed in the case 3. All of the top face 5 of the case 3 is inclined downward toward the front side (in the direction B shown in FIG. 1). The top face 5 is divided into a top face front portion 9 and a top face rear portion 11 by a ridge line 7 passing through the top face. The ridge line 7 is parallel to the direction C perpendicular to the direction B (refer to FIG. 1). The top face front portion 9 is a flat surface except for a concave portion 13 described later. The top face rear portion 11 is also a flat surface. The inclination angle of the top face front portion 9 (except the concave portion 13) is greater than the inclination angle of the top face rear portion 11. Hence, as shown in FIG. 3, when viewing the in-vehicle camera 1 from the side, the top face 5 has a bent angular shape in which the ridge line 7 is the top (inflection point).

The top face front portion 9 has the concave portion 13 in a portion thereof including the front end. The concave portion 13 is concaved with respect to the periphery thereof. As shown in FIG. 2, the concave portion 13 includes an in-concave portion top face 13a, a lens mounted face 13b and a pair of right-and-left side faces 13c, 13d. The inclination angle of the in-concave portion top face 13a is less than those of other portions of the top face front portion 9. The lens mounted face 13b sharply and almost vertically stands at the rear side with respect to the in-concave portion top face 13a and faces toward the front side. A lens 15 is mounted on the lens mounted face 13b. That is, the lens 15 is exposed at the top face front portion 9.

The rear end of the concave portion 13 reaches the ridge line 7. The top edge of the lens mounted face 13b is aligned with the ridge line 7. The top of the lens 15 contacts the ridge line 7. Hence, the lens 15 is positioned in the vicinity of the ridge line 7.

In addition, as shown in FIG. 1, the in-vehicle camera 1 includes the hood 17 attached to the concave portion 13 of the case 3. The hood 17 includes a bottom face portion 17a and a pair of side face portions 17b, 17c which are provided so as to stand at both right and left sides of the bottom face portion 17a. When the hood 17 is attached to the concave portion 13, the bottom face portion 17a and the side face portions 17b, 17c are brought into contact with the in-concave portion top face 13a and the side faces 13c, 13d, respectively. In this state, the bottom face portion 17a projects longer than the case 3 toward the front side. The top edges of the side face portions 17b, 17c are inclined substantially to the same extent as the top face front portion 9, and project slightly longer than the top face front portion 9 to the top side.

Cylindrical projections 23, 25 are respectively provided in the vicinity of the top edges of side faces 19, 21 positioned in the lateral direction of the case 3.

The in-vehicle camera 1 is attached to the windshield 101 of the vehicle by the bracket 27 shown in FIG. 4. The bracket 27 includes a top board 27a, latches 27b, 27c, a rear board 27d, a plate spring 29, and a plate spring 31. The top board 27a is bonded to the windshield 101. The latches 27b, 27c project downward at both right-and-left ends of the under surface of the top board 27a. The rear board 27d projects downward at the rear end of the under surface of the top board 27a. The plate spring 29 is provided at the center of the under surface of the top board 27a. The plate spring 31 is provided on the front side of the rear board 27d.

The in-vehicle camera 1 is attached to the bracket 27 as described below. The latches 27b, 27c of the bracket 27 have L shapes. As shown in FIG. 6, the latches 27b, 27c latch the projections 23, 25 of the case 3 to suspend the in-vehicle camera 1 so as not to fall. In addition, as shown in FIG. 6, the plate spring 29 biases the in-vehicle camera 1 downward. The plate spring 31 biases the in-vehicle camera 1 forward. As a result, the bracket 27 can fix the in-vehicle camera 1 without rattling.

As described above, the bracket 27 is fixed to the windshield 101 from the inside of the vehicle by bonding the top board 27a to the windshield 101. Hence, when the in-vehicle camera 1 is attached to the bracket 27, the in-vehicle camera 1 is attached to the windshield 101. In this case, the top face 5 of the in-vehicle camera 1 is opposed to the windshield 101.

2. Advantages of the In-Vehicle Camera 1:

(1) The top face 5 of the in-vehicle camera 1 has a bent angular shape in which the ridge line 7 is the top (inflection point). Hence, as shown in FIG. 3, at least portion of the ridge line 7 of the top face 5 can be close to the windshield 101 in both cases of a windshield 101A having a steep inclination and a windshield 101B having a gentle inclination. Since the lens 15 is positioned in the vicinity of the ridge line 7, the lens 15 can be close to the windshield 101 in cases where the inclination angle of the windshield 101 is either relatively large or relatively small.

As a result, the phenomenon can be prevented in which the light L coming from the lower side is reflected off the windshield 101 and enters the lens 15 (reflection). In addition, since the large amount of projection of the hood 17 toward the front side is not required, the in-vehicle camera 1 can be installed in a narrow space. In addition, since it is not required to manufacture the cases 3 having different inclination angles of the top face 5 depending on the inclination angles of the windshields 101 (depending on the type of vehicle), the cost of manufacturing for the in-vehicle camera 1 can be reduced.

(2) When the in-vehicle camera 1 is attached so that the optical axis of the lens 15 is directed to the front side and the top face 5 is opposed to the windshield 101, the ridge line 7 is a straight line perpendicular to the direction in which the windshield 101 is inclined. Hence, even if inclination angles of the windshields 101 are different from each other, all of the ridge line 7 can be close to the windshield 101. Hence, the reflection can be further prevented.

(3) In the in-vehicle camera 1, the bent angular shape of the top face 5 is formed of two flat surfaces (the top face front portion 9 and the top face rear portion 11) divided by the ridge line 7. Hence, since portions of the top face 5 except the ridge line 7 (portions formed of the flat surfaces) do not protrude, the ridge line 7 can be further close to the windshield 101. Therefore, the reflection can be further prevented.

It will be appreciated that the present invention is not limited to the configurations described above, but any and all modifications, variations or equivalents, which may occur to those who are skilled in the art, should be considered to fall within the scope of the present invention.

For example, the bracket 27 may be attached to the ceiling of the vehicle interior or attached between the windshield 101 and the ceiling of the vehicle interior. In addition, the in-vehicle camera 1 may be attached to the rear window or in the vicinity thereof to take images of views from the rear of the vehicle. In this case, the in-vehicle camera 1 faces in the direction opposed to the direction in which the in-vehicle camera 1 faces when attached to the windshield 101. Furthermore, the in-vehicle camera 1 may be attached to a side window or in the vicinity thereof to take images of views from a side of the vehicle. In this case, the in-vehicle camera 1 faces in the direction substantially perpendicular to the direction in which the in-vehicle camera 1 faces when attached to the windshield 101.

The in-vehicle camera 1 may possibly not include the hood 17. The top face front portion 9 (except the concave portion 13) and the top face rear portion 11 might not be exact flat surfaces. For example, the top face front portion 9 and the top face rear portion 11 may be provided with a convex portion which does not block a groove or the concave portion, and the lens 15 from being close to the windshield 101.

Figure 7:
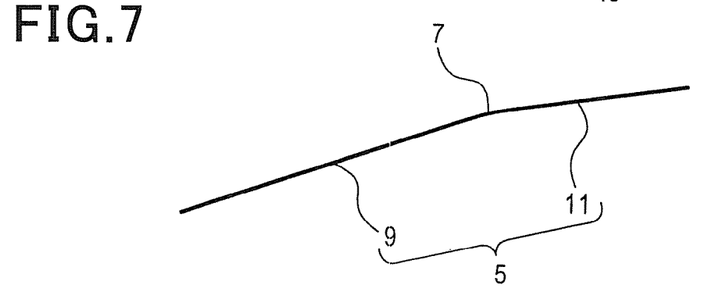
FIG. 7 is a side view showing a shape of a top face according to another embodiment.

The shape of the top face 5 viewed from the side may be the shape shown in FIG. 7. That is, the boundary (bent portion) between the top face front portion 9 (except the concave portion 13) and the top face rear portion 11 may be curved. In this case, the ridge line 7 may be a center line of the area which is curved.

The ridge line 7 may not be parallel to the direction C but be intersected with the direction C. That is, the ridge line 7 may be parallel to the direction in which the windshield 101 is inclined. The ridge line 7 may not be a straight line. For example, the ridge line 7 may be a curved line or a line bent in a dogleg shape or cranked shape.

Hereinafter, aspects of the above-described embodiments will be summarized.

As an aspect of the embodiment, an in-vehicle camera is provided which has a case and a lens, and which is attached in a vehicle interior so that the lens is exposed at a top face of the case and the top face is opposed to a windshield. The top face has an angular shape bent at a ridge line passing through the top face. The lens is positioned in the vicinity of the ridge line.

According to the in-vehicle camera, since the top face of the case has the above shape, at least portion of the ridge line of the top face of the case can be close to the windshield in both cases where the windshield has a large inclination angle and where the windshield has a small inclination angle. In addition, since the lens is positioned in the vicinity of the ridge line, the lens can be close to the windshield in cases where the inclination angle of the windshield is either relatively large or relatively small.

As a result, reflection can be prevented. In addition, since a long hood is not required to be attached to the in-vehicle camera to prevent the reflection, the in-vehicle camera can be installed in a narrow space. In addition, since it is not required to manufacture cases having different inclination angles of the top face depending on the inclination angles of the windshields (depending on the type of vehicle), the cost of manufacturing for the in-vehicle camera can be reduced.

It is preferable that when the in-vehicle camera is attached so that the optical axis of the lens is directed to the front side and the top face is opposed to the windshield, the ridge line is a straight line perpendicular to the direction in which the windshield is inclined.

Accordingly, even if inclination angles of the windshields (e.g. downward inclination) are different from each other, all of the ridge line can be close to the windshield. Hence, the reflection can be further prevented.

In the in-vehicle camera, the angular shape of the top face is preferably formed of two flat surfaces divided by the ridge line. Accordingly, since portions of the top face except for the ridge line (portions formed of the flat surfaces) do not protrude, the ridge line can be further close to the windshield. Therefore, reflection can be further prevented.

Note that cases where the lens is positioned in the vicinity of the ridge line include a case where the edge of the lens contacts the ridge line, a case where the lens intersects with the ridge line, and a case where the distance between the edge of the lens and the ridge line is shorter than the distance between the ridge line and the windshield.

What is claimed is:

1. An in-vehicle camera comprising:
    a case; and
    a lens; wherein
    the in-vehicle camera is attached in a vehicle interior so that the lens is exposed at a top face of the case and the top face is opposed to a windshield or another window,
    the top face has an angular shape bent at a ridge line passing through the top face,
    the lens is positioned in the vicinity of the ridge line, and
    the case is fixed to the windshield or the another window by a bracket so that an optical axis of the lens is directed directly to a front side.

2. The in-vehicle camera according to claim 1, wherein when the in-vehicle camera is attached so that an optical axis of the lens is directed to a front side and the top face is opposed to the windshield or the another window, the ridge line is a line perpendicular to a direction in which the windshield or the another window is inclined.

3. The in-vehicle camera according to claim 1, wherein the angular shape of the top face is formed of two flat surfaces divided by the ridge line.

4. The in-vehicle camera according to claim 1, wherein the angular shape of the top face is curved.

5. The in-vehicle camera according to claim 1, wherein when the in-vehicle camera is attached so that an optical axis of the lens is directed to a front side and the top face is opposed to the windshield or the another window, the ridge line is a line parallel to the direction in which the windshield or the another window is inclined.

6. The in-vehicle camera according to claim 1, wherein the bracket includes a top board fixed to the windshield or another window and latches projecting downward from the top board, and
    the latches latch the case to attach the bracket to the case.

7. The in-vehicle camera according to claim 1, further comprising a biasing member which biases the case forward from a rear side of the case.

8. The in-vehicle camera according to claim 1, wherein the lens is positioned immediately adjacent the ridge line.

9. The in-vehicle camera according to claim 1, wherein the ridge line is a continuous straight line over an entire length of the ridge line.

10. The in-vehicle camera according to claim 1, wherein the ridge line is closer to the windshield or the another window than any portion of a rear portion of the top face of the case.

11. The in-vehicle camera according to claim 1, wherein:
    the top face includes a front portion disposed toward the front side from the ridge line and a rear portion disposed away from the front side from the ridge line; and
    the front portion of the top face is not parallel to the windshield or the another window.

12. The in-vehicle camera according to claim 9, wherein the lens is positioned immediately adjacent the ridge line.

13. The in-vehicle camera according to claim 10, wherein the lens is positioned immediately adjacent the ridge line.

14. An in-vehicle camera comprising:
    a case; and
    a lens; wherein
    the in-vehicle camera is attached in a vehicle interior so that the lens is exposed at a top face of the case and the top face is opposed to a windshield or another window,
    the top face has an angular shape bent at a ridge line passing through the top face,
    the lens is positioned in the vicinity of the ridge line, and
    the in-vehicle camera further comprising a spring biasing the case forward from a rear side of the case.

15. The in-vehicle camera according to claim 14, wherein the in-vehicle camera further comprising a bracket attached to the case from a side of the top face and fixes the case to the windshield or the another window so that an optical axis of the lens is directed to a front side of the vehicle.

16. The in-vehicle camera according to claim 14, wherein:
    the top face includes a front portion disposed toward the front side from the ridge line and a rear portion disposed away from the front side from the ridge line; and
    the front portion of the top face is not parallel to the windshield or the another window.

17. An in-vehicle camera comprising:
    a case; and
    a lens; wherein
    the in-vehicle camera is attached in a vehicle interior so that the lens is exposed at a top face of the case and the top face is opposed to a windshield or another window,
    the top face is configured by a first face and a second face whose inclination angles are different from each other, the first face being positioned at a front side with respect to a ridge line passing through the top face, and the second face being positioned at a rear side with respect to the ridge line,
    the lens is positioned in the vicinity of the ridge line, and
    the case is fixed to the windshield or another window by a bracket so that an optical axis of the lens is directed directly to the front side.

18. The in-vehicle camera according to claim 17, wherein the first face of the top face is not parallel to the windshield on the another window.

19. An in-vehicle camera comprising:
    a case; and
    a lens; wherein
    the in-vehicle camera is attached in a vehicle interior so that the lens is exposed at a top face of the case and the top face is opposed to a windshield or another window,
    the top face is configured by a first face and a second face,
    the lens is positioned in the vicinity of a border between the first face and the second face, and
    the case is fixed to the windshield or another window by a bracket so that an optical axis of the lens is directed directly to a front side.

20. The in-vehicle camera according to claim 19, wherein:
the first face is disposed toward the front side from a ridge line passing through the top face and the second face is disposed away from the front side from the ridge line; and
the first face of the top face is not parallel to the windshield on the another window.

* * * * *